(12) United States Patent
Eldor et al.

(10) Patent No.: US 9,604,788 B2
(45) Date of Patent: Mar. 28, 2017

(54) FREEWHEEL ASSIST FOR A SPIRAL CONVEYOR BELT SYSTEM

(71) Applicant: TARPAULIN.COM, INC., Woodbury, NY (US)

(72) Inventors: Niv Eldor, South Setauket, NY (US); Erik Barcus, Huntington Station, NY (US); Ronald DeGennaro, Holbrook, NY (US)

(73) Assignee: TARPAULIN.COM, INC., Woodbury, NY (US)

( * ) Notice: Subject to any disclaimer, the term of this patent is extended or adjusted under 35 U.S.C. 154(b) by 0 days.

(21) Appl. No.: 15/097,811

(22) Filed: Apr. 13, 2016

(65) Prior Publication Data

US 2016/0304285 A1 Oct. 20, 2016

Related U.S. Application Data

(60) Provisional application No. 62/149,215, filed on Apr. 17, 2015.

(51) Int. Cl.
*B65G 21/18* (2006.01)
*B65G 23/36* (2006.01)

(52) U.S. Cl.
CPC ............. *B65G 23/36* (2013.01); *B65G 21/18* (2013.01); *B65G 2207/24* (2013.01)

(58) Field of Classification Search
CPC ............................ B65G 21/18; B65G 2207/24
USPC ....................................................... 198/778
See application file for complete search history.

(56) References Cited

U.S. PATENT DOCUMENTS

| | | | | |
|---|---|---|---|---|
| 1,767,905 A | * | 6/1930 | Walker ...................... | B04B 3/08 |
| | | | | 198/778 |
| 1,837,502 A | * | 12/1931 | Thompson ................ | A23L 3/06 |
| | | | | 198/778 |
| 4,741,430 A | * | 5/1988 | Roinestad .............. | B65G 21/18 |
| | | | | 198/778 |
| 4,850,475 A | * | 7/1989 | Lupo ...................... | B65G 21/18 |
| | | | | 198/778 |
| 4,866,354 A | * | 9/1989 | Miller .................... | B65G 21/18 |
| | | | | 198/778 |
| 5,105,934 A | * | 4/1992 | Cawley .................. | B65G 21/18 |
| | | | | 198/778 |
| 6,394,261 B1 | | 5/2002 | DeGennaro | |
| 6,523,677 B1 | | 2/2003 | DeGennaro et al. | |
| 7,044,287 B1 | | 5/2006 | Gray | |
| 7,210,569 B1 | | 5/2007 | Tarhan et al. | |
| 7,946,415 B2 | | 5/2011 | DeGennaro, Jr. | |
| 8,161,901 B1 | | 4/2012 | DeGennaro et al. | |
| 8,197,117 B2 | | 6/2012 | White | |
| 8,770,393 B1 | | 7/2014 | DeGennaro, Jr. | |
| 8,926,463 B1 | | 1/2015 | Eldor | |
| 9,032,976 B2 | | 5/2015 | Berntsen et al. | |

* cited by examiner

*Primary Examiner* — James R Bidwell
(74) *Attorney, Agent, or Firm* — Hoffmann & Baron, LLP

(57) ABSTRACT

A spiral conveyor belt system generally includes a rotatable cage, a first drive mechanism for rotating the cage about an axis in a first direction, an endless conveyor belt supported by the cage and a rotatable free wheel. The cage drives the conveyor belt along a helical path in a first direction and the rotatable free wheel rotates about an axis in a second direction opposite the first direction for guiding the endless conveyor belt from the cage along a return path and back to the cage. A second drive mechanism is preferably provided for rotating the free wheel.

17 Claims, 8 Drawing Sheets

FREEWHEEL ASSIST FOR A SPIRAL CONVEYOR BELT SYSTEM

CROSS-REFERENCE TO RELATED APPLICATIONS

This application claims the benefit of U.S. Provisional Application Ser. No. 62/149,215 filed Apr. 17, 2015, the disclosure of which is hereby incorporated by reference in its entirety.

BACKGROUND OF THE INVENTION

The present invention relates to drive mechanisms for conveyor belt systems and, more particularly, to a free wheel assist drive mechanism for reducing the tension on the conveyor belt used in a spiral conveyor belt system.

Spiral conveyor belt systems are well-known in the art. They are commonly used in applications where it is desired to keep an item moving for an extended period of time within a contained environment, e.g., a product traveling through a refrigeration zone for cooling. As will be recognized by those skilled in the art, a spiral system typically consists of an endless conveyor belt traveling through concentric stacked helical paths whereby an item travels upward in elevation along the helical paths and/or downward in elevation along the helical paths.

Spiral systems typically utilize a cage (sometimes known as a "drum") for driving the conveyor belt. More particularly, the cage is centrally positioned within the helical path, and may include a plurality of circumferentially-spaced vertical driving bars which contact the inner edge of the belt to impart a driving force thereto. As the cage rotates, the conveyor belt is pulled along its helical path.

In many applications, the cage extends from and is supported by a centrally-located shaft. In turn, the shaft is rotatably supported upon a stationary frame. A drive mechanism is connected to the cage, and rotates the cage with respect to the frame. As the drive mechanism turns the cage, the cage contacts/drives the belt through the helical pathway of the conveyor belt system. Smaller cages often times utilize a center drive mechanism which directly communicates with the center shaft, resulting in rotation of the cage. Larger cages typically utilize a chain and tooth arrangement whereby the chain extends around the circumference of the cage and engages teeth located on the circumference of such cage. The chain in turn communicates with a drive motor.

On spiral conveyor systems, the belt runs continuously from a discharge region of the cage to an infeed region to repeat the spiral conveying. The path between the discharge region and the infeed region of the cage is called "the return path." In the return path, the conveyor belt runs in the opposite direction to the belt supported on the spiral path of the cage. Moreover, in all cases when the infeed is not aligned with the discharge, the belt must be traversed along a curved return path.

Accordingly, there is a need in the art to guide the conveyor belt along the curved return path back to the infeed of the spiral cage. It would also be desirable to reduce the tension in the belt in the return path.

SUMMARY OF THE INVENTION

The spiral conveyor belt system according to the present invention generally includes a rotatable cage, a first drive mechanism for rotating the cage about an axis in a first direction, an endless conveyor belt supported by the cage and a rotatable free wheel. The cage drives the conveyor belt along a helical path in a first direction and the rotatable free wheel rotates about an axis in a second direction opposite the first direction for guiding the endless conveyor belt from the cage along a return path and back to the cage.

In a preferred embodiment, the spiral conveyor belt system further includes a conveyor belt return assembly for reversing the direction of the conveyor belt between the helical path and the return path. The conveyor belt return assembly preferably includes a radially oriented conveyor portion for guiding the conveyor belt between the cage and the free wheel along a radial direction with respect to the helical path and an axially oriented conveyor portion for guiding the conveyor belt between the cage and the free wheel along an axial direction with respect to the helical path.

The free wheel preferably has a diameter substantially equal to an outer diameter of the cage. The free wheel also preferably has an outer circumferential surface frictionally engaging an inner lateral edge of the conveyor belt for guiding the conveyor belt along its return path.

In a preferred embodiment, a second drive mechanism is provided for rotating the free wheel. In this case, the first drive mechanism comprises a first motor and the second drive mechanism comprises a second motor separate from the first motor. The second motor is preferably disposed on an inner side of the free wheel for driving an inner circumferential surface of the free wheel.

The second drive mechanism preferably includes both a second motor and a drive wheel coupled to the second motor between the motor and the free wheel. The drive wheel preferably engages an inner circumferential surface of the free wheel, whereby the motor rotates the drive wheel and the drive wheel drives the free wheel in the second direction.

The second drive mechanism further preferably includes a flexible coupling for maintaining frictional contact between the drive wheel and the free wheel. The flexible coupling preferably includes a support plate, a motor arm pivotably connected to the support plate about a pivot point and a biasing element fixed to the support plate. The second motor and the drive wheel are mounted to one end of the motor arm and the biasing element engages an opposite end of the motor arm with respect to the pivot point, such that the biasing element biases the drive wheel into frictional engagement with the free wheel.

In a method for conveying an endless conveyor belt in a spiral conveyor belt system according to the present invention, the endless conveyor belt is driven along a helical path by rotating a cage about an axis in a first direction and the endless conveyor belt is guided from the rotating cage along a return path and back to the cage with a free wheel rotating about an axis in a second direction opposite the first direction, wherein guiding the conveyor belt along its return path preferably involves frictionally engaging an inner lateral edge of the conveyor belt with an outer circumferential surface of the free wheel.

The method further preferably includes the step of reversing direction of the conveyor belt between the helical path and the return path with a conveyor belt return assembly. This step preferably involves guiding the conveyor belt between the cage and the free wheel along a radial direction with respect to the helical path with a radially oriented conveyor portion of the conveyor belt return assembly and further guiding the conveyor belt between the cage and the free wheel along an axial direction with respect to the helical path with an axially oriented conveyor portion of the conveyor belt return assembly.

The method also preferably involves driving the cage in the first direction with a first drive mechanism and driving the free wheel in the second direction with a second drive mechanism, wherein driving the free wheel involves driving a drive wheel with a motor, wherein the drive wheel frictionally engages the free wheel for driving the free wheel in the second direction. In addition, the drive wheel is preferably urged against the free wheel with a biasing element for maintaining frictional contact between the drive wheel and the free wheel.

The present invention, which addresses the needs of the prior art, relates to a drive mechanism for a free wheel in a spiral conveyor belt system. As a result, the present invention provides an improved drive mechanism for reducing the tension in the conveyor belt in the freewheel assembly of the return path of the belt.

Features of the disclosure will become apparent from the following detailed description considered in conjunction with the accompanying drawings. It is to be understood, however, that the drawings are designed as an illustration only and not as a definition of the limits of this disclosure.

DETAILED DESCRIPTION OF THE INVENTION

Figure 4:
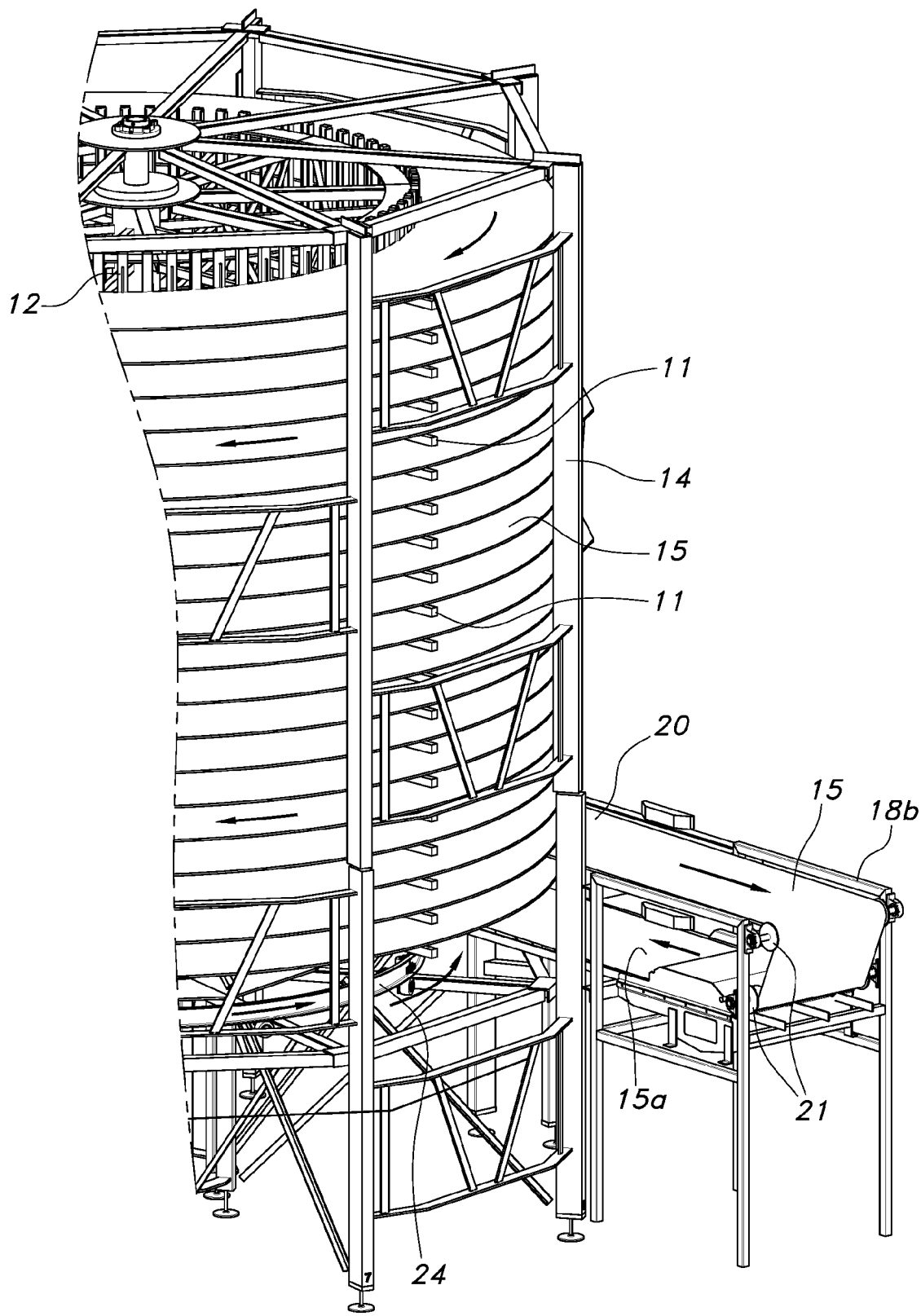
FIG. 4 is an isolated detail view of the embodiment of the present invention shown in FIG. 3 showing the conveyor belt.
Figure 5:
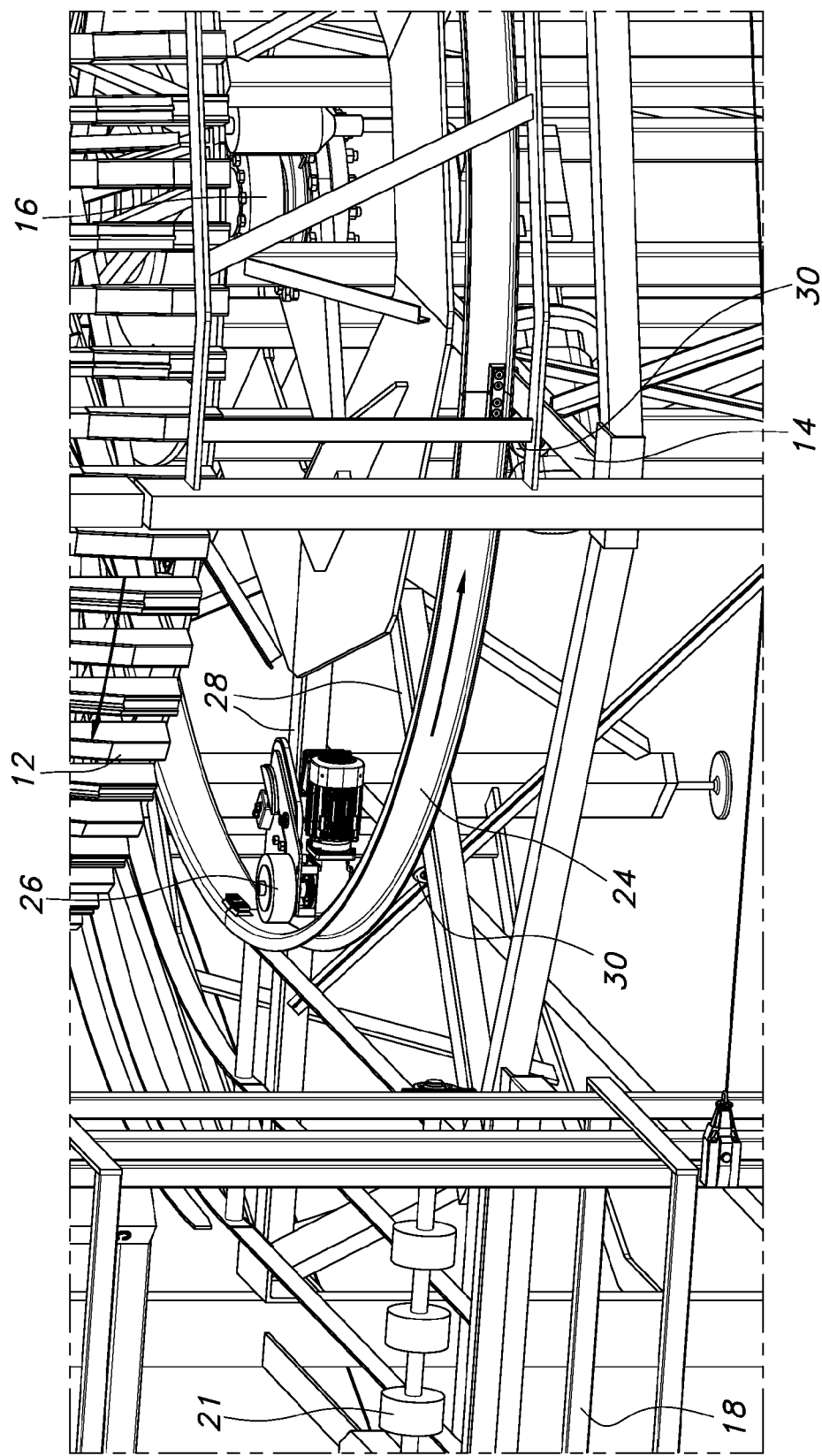
FIG. 5 is an enlarged perspective view of the embodiment of the free wheel assembly shown in FIGS. 3 and 4.
Figure 6:
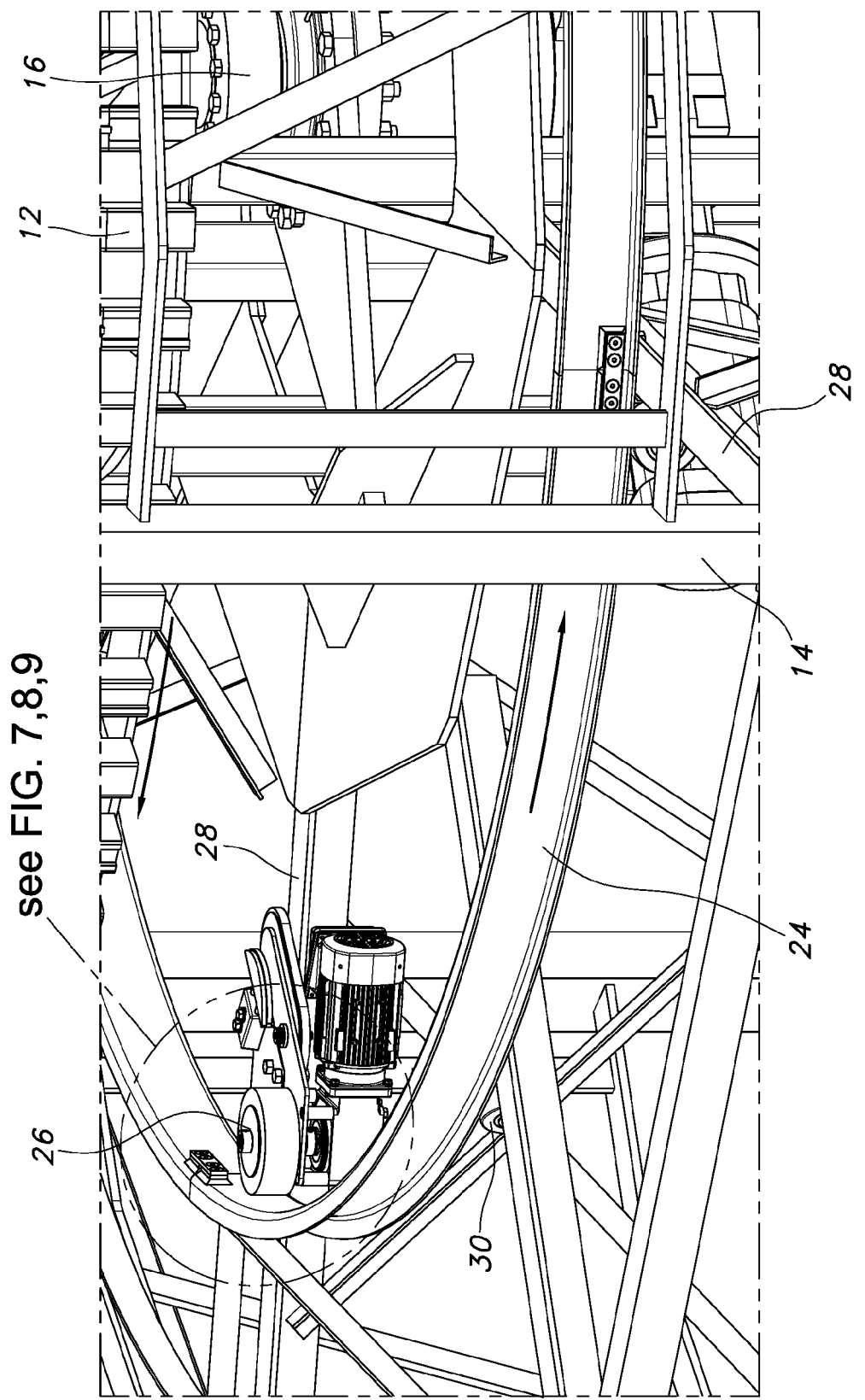
FIG. 6 is an enlarged perspective view of the embodiment of the free wheel assembly shown in FIG. 5.

Referring first to FIGS. 1-4, a spiral conveyor belt system 10 is shown. The system generally includes a rotating cage 12 supported on a rotatable central shaft 13 of a stationary frame 14. A motor 16 drives the shaft 13 for rotating the cage 12, which in turn drives a conveyor belt 15 along a helical path, as shown in FIG. 4. In the embodiment shown in the drawings, the motor 16 is centrally located within the frame 14 to directly drive the shaft 13. However, as mentioned above, a roller chain, which extends around the outer circumference of the cage 12 may be utilized to turn the cage 12 when driven by a motor.

As shown in FIG. 4, in one preferred embodiment, the cage 12 includes a plurality of horizontal supports 11 extending radially outwardly from spaced locations along the periphery of the cage 12 to support the conveyor belt 15. The horizontal supports 11 are also axially arranged along the vertical length of the cage 12 so as to define a helical path for the belt 15.

The system 10 further preferably includes a conveyor belt return assembly 18 for guiding the conveyor belt 15 from a discharge region 20 of the cage 12 to an infeed region 22 of the cage. The conveyor belt return assembly 18 preferably includes an arrangement of rollers 21 and guides for supporting the conveyor belt 15 along its return path from the discharge region 20 to the in feed region 22.

Figure 1:
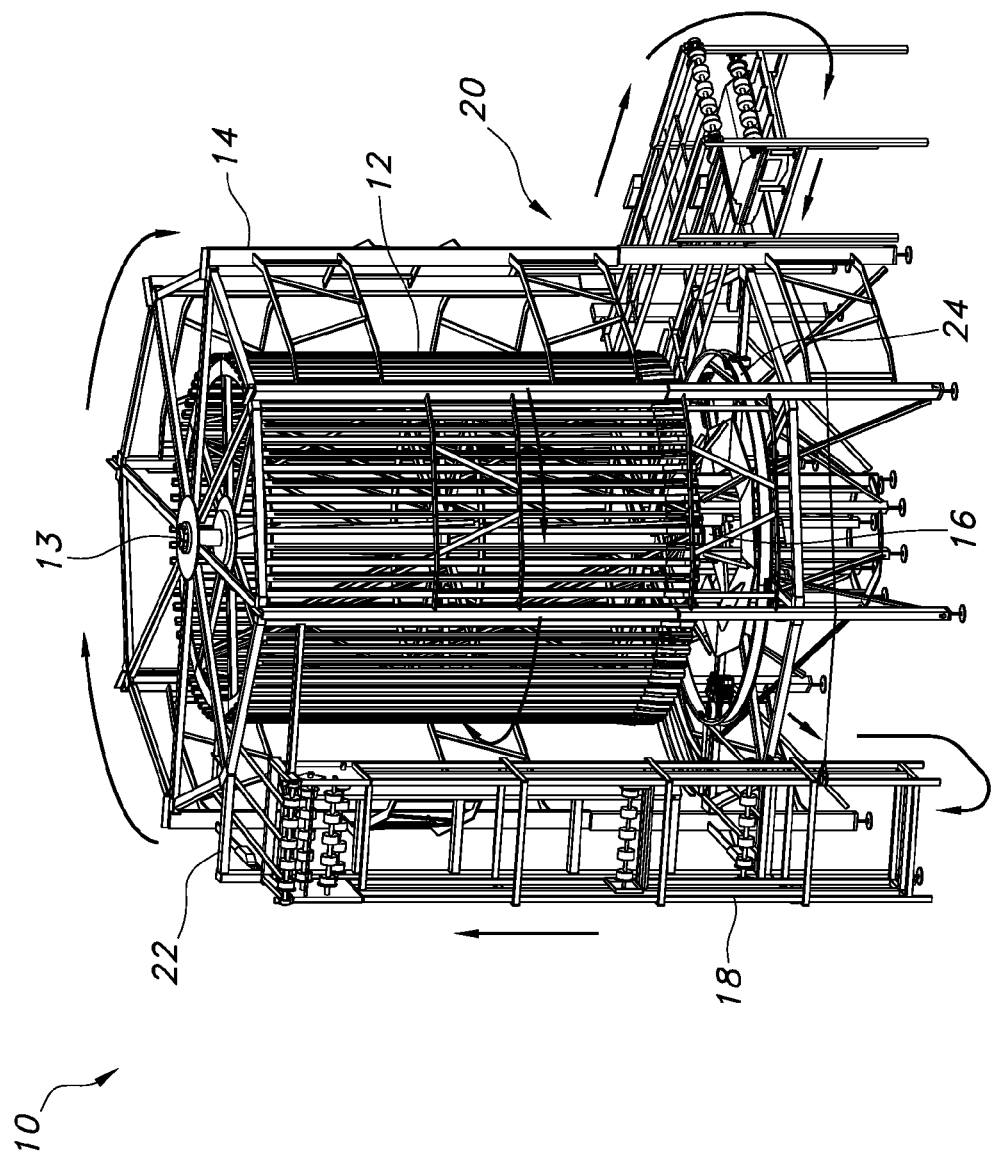
FIG. 1 is a perspective view of a spiral conveyor belt system formed in accordance with an embodiment of the present invention.
Figure 2:
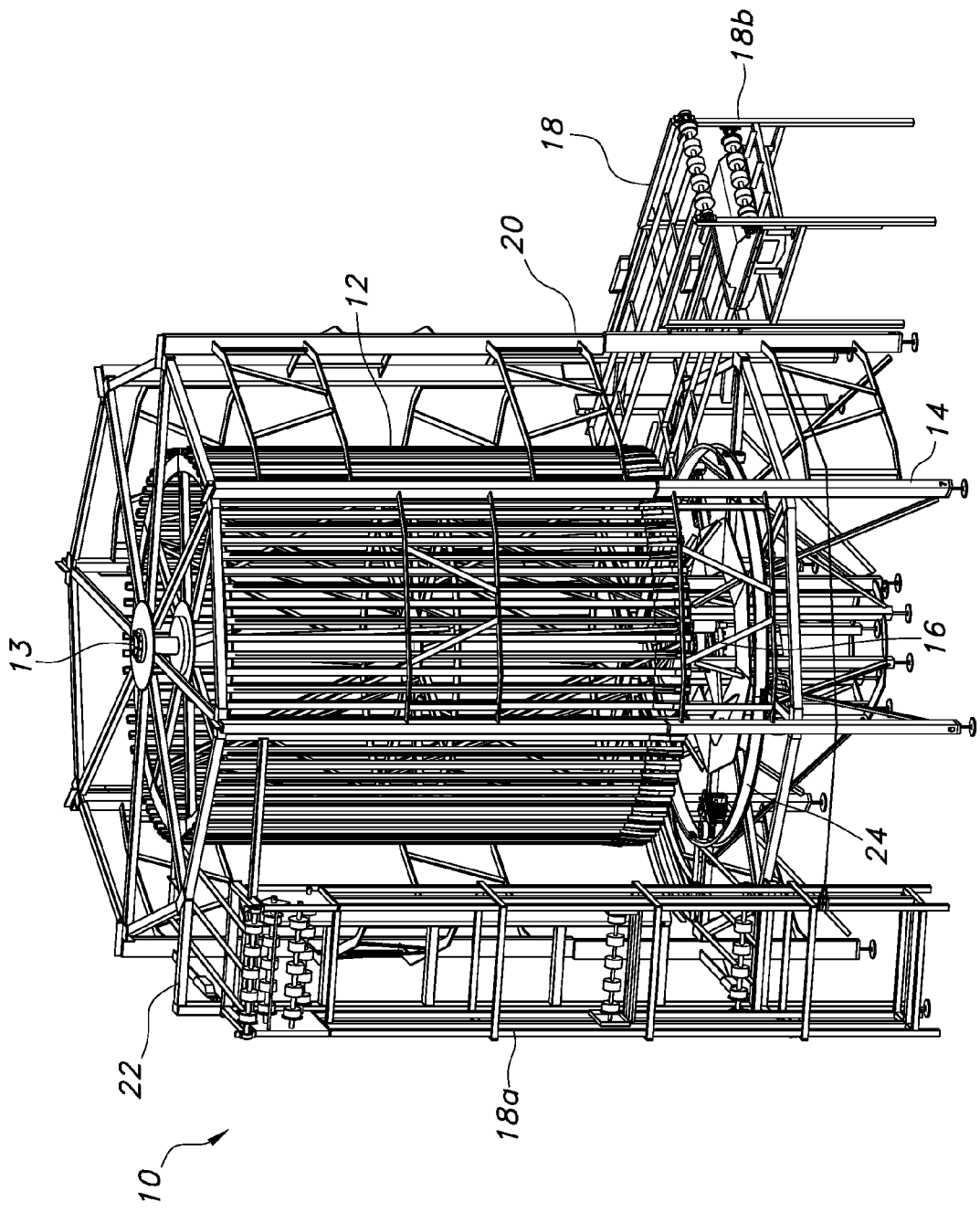
FIG. 2 is an enlarged perspective view of the embodiment of the present invention shown in FIG. 1.
Figure 3:
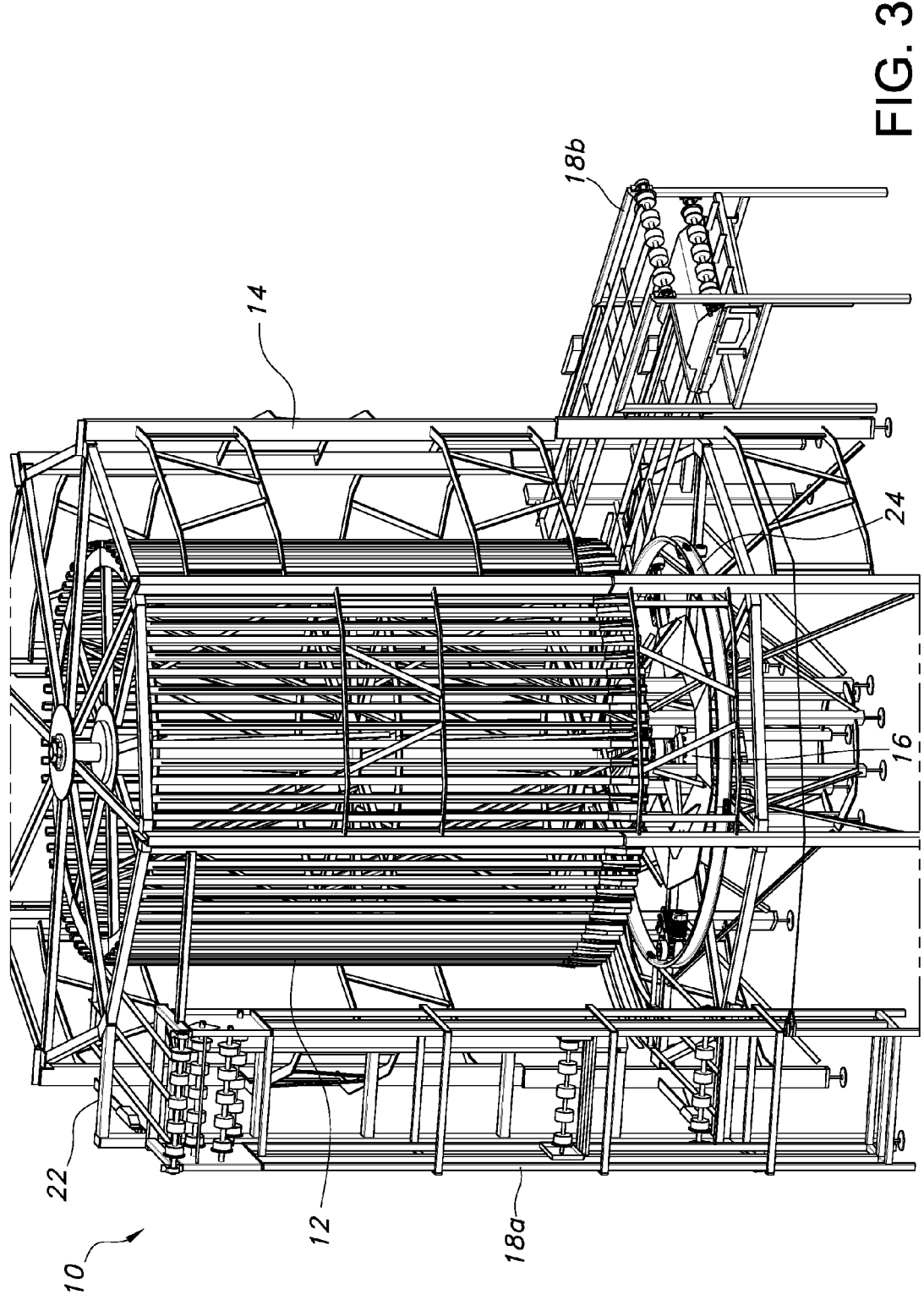
FIG. 3 is an enlarged perspective view of the embodiment of the present invention shown in FIG. 2.

Thus, the system 10 shown in FIG. 1 includes a cage 12 rotating clockwise and having a discharge region 20 at the lower right of FIG. 1 and an infeed region 22 at the upper left of the drawing. The cage 12 includes an arrangement of horizontal supports provided around the cage to define a helical path (shown by the arrows) for the belt 15 (not shown in FIG. 1) beginning at the infeed region 22 and ending at the discharge region 20. The conveyor belt return assembly 18 guides the conveyor belt 15 back to the in feed region 22.

It is anticipated that the direction of the travel of the belt 15 can be reversed from that shown in FIGS. 1 and 4. In this case, the discharge region for the belt 15 would be located at the upper part of the cage, and the in feed region would be located at the lower part of the cage. In this embodiment, the cage 12 shown in FIG. 1 would rotate counter-clockwise.

In either case, it can be appreciated by one skilled in the art that, in order to return the belt 15 back to the in feed region 22 of the cage 12, a number of reorientations of the belt is required. First, the path of the belt 15 must reverse direction. This is shown by the arrows in FIGS. 1 and 4 shown adjacent to the discharge region 20 of the cage 12 at the horizontal discharge portion 18b of the conveyor belt return assembly 18, Next, the belt 15 must be guided back around the cage 12 in the opposite direction to the direction of rotation of the cage. This is illustrated by the curved arrows shown in FIGS. 1 and 4, where the belt 14 is driven clockwise in a helical path on the cage 12, but is returned in a counter-clockwise direction below the cage. The belt 15 must then be conveyed vertically up back to the infeed region 22 of the cage to begin the clockwise helical path again. A vertical in feed portion 18a of the conveyor belt return assembly 18 with associated guides and rollers 21 is provided to convey the belt vertically back up to the in feed region of the cage 12.

In order to guide the belt 15 back around the cage 12 along its return path, the system 10 of the present invention utilizes a free wheel 24 rotatably supported on the frame 14 below the cage 12. The free wheel 24 has a circular shape and is freely and independently rotatable with respect to both the frame 14 and the cage 12 about the central shaft 13. The free wheel 24 may be supported on the frame 14 via a bearing or roller arrangement so that the free wheel can rotate independently of the cage 12.

The free wheel 24 has an outer circumferential surface that frictionally engages an inner lateral edge 15a of the belt 15 as it travels around the central shaft 13 of the cage. The diameter of the free wheel 24 is selected so as to define a large enough radial path for the belt without damaging the belt. In a preferred embodiment, the diameter of the free wheel 24 is substantially equal to the outer diameter of the cage 12.

As the belt 15 traverses along its return path, the inner lateral edge 15a of the belt engages the outer circumferential surface of the free wheel 24. Thus, the free wheel 24 will rotate in the opposite direction from that of the cage 12 by virtue of the belt being driven by the rotating cage. In this embodiment, the free wheel 24 acts solely as a guide for the belt 15 along its return path.

However, in order to reduce the tension on the belt, the system 10 according to the present invention further preferably utilizes a second drive mechanism 26 for rotating the free wheel 24 in the direction opposite to the direction of the cage 12. In this embodiment, the second drive mechanism 26 assists the motor 16 (first drive mechanism) in conveying the belt 15 along the belt's return path so as to relieve the driving force imparted by the cage 12 from the belt.

Referring now to FIGS. 5-9, the second drive mechanism 26 is supported on the frame 14 and is preferably disposed inside the circumference of the free wheel 24. Thus, the frame 14 may include a plurality of radially extending support beams 28 for supporting both the free wheel 24 and the second drive mechanism 26. These support beams 28 may also be provided with rollers 30 to rotatably support the free wheel 24 on the frame 14. The free wheel 24 can be axially supported in any manner, such as by radial spokes and/or guides (not shown).

Figure 7:
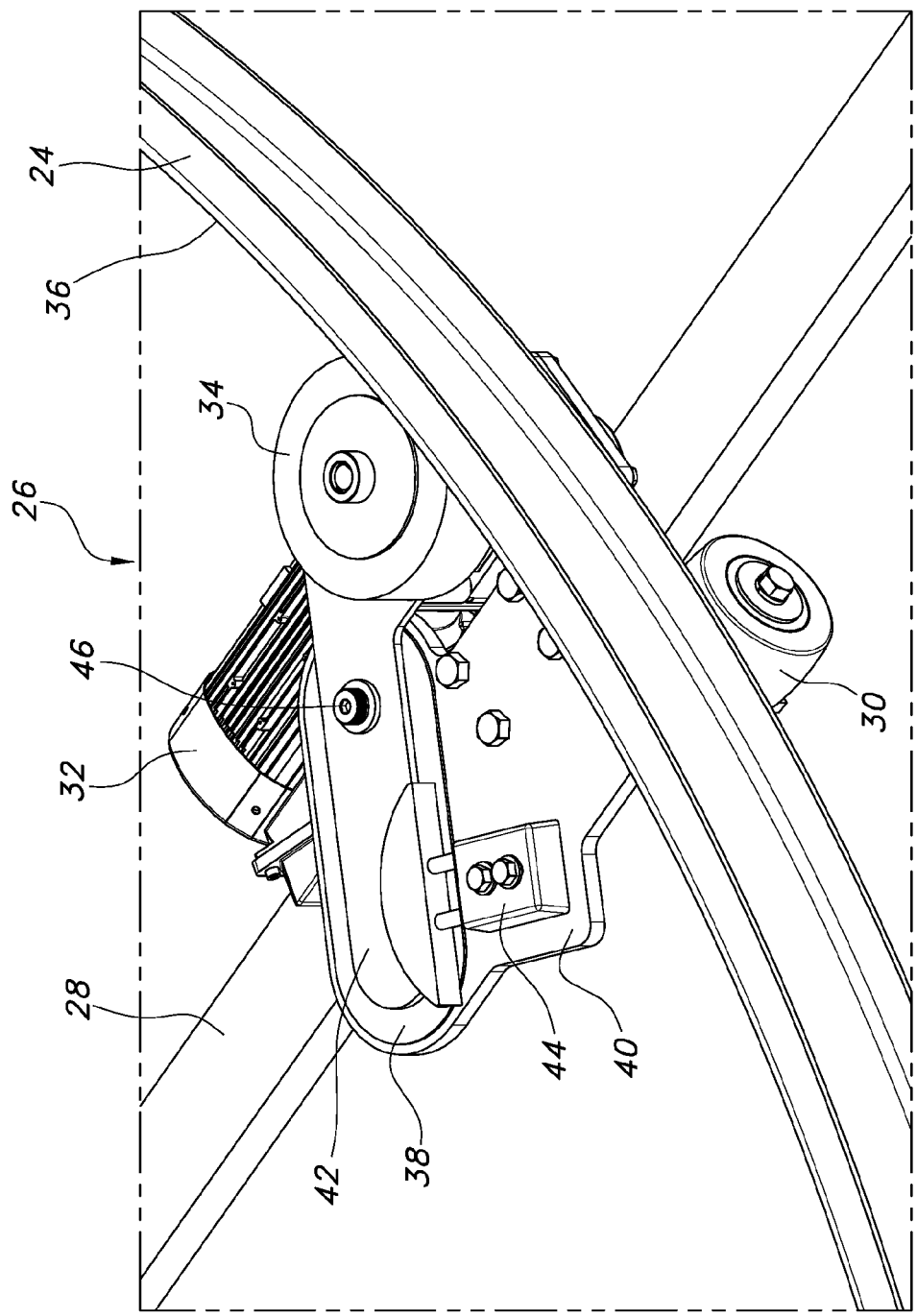
FIG. 7 is an isolated perspective view of the drive mechanism for the free wheel assembly shown in FIG. 6.
Figure 8:
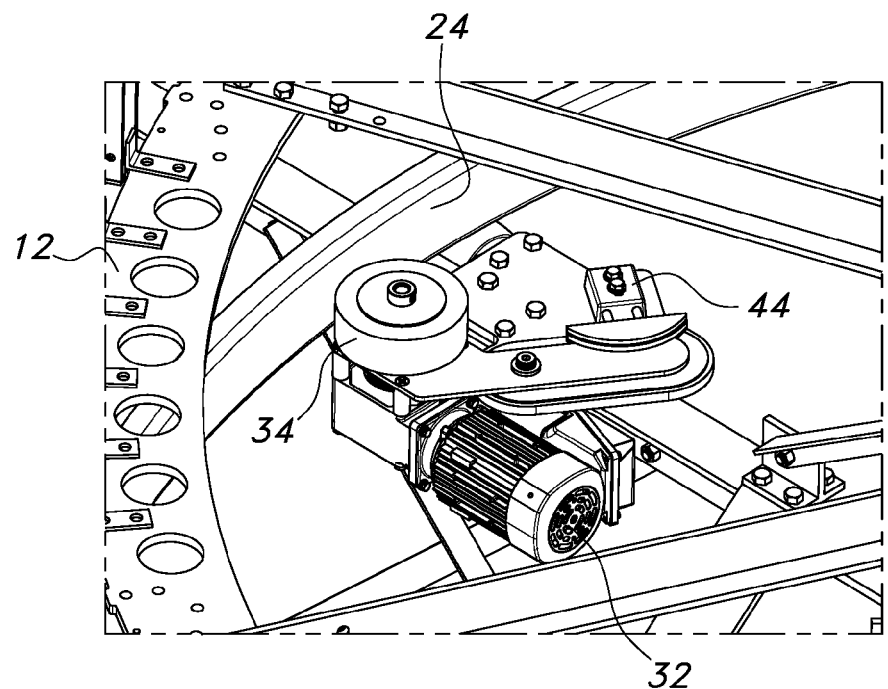
FIG. 8 is another perspective view of the drive mechanism for the free wheel assembly shown in FIG. 6.
Figure 9:
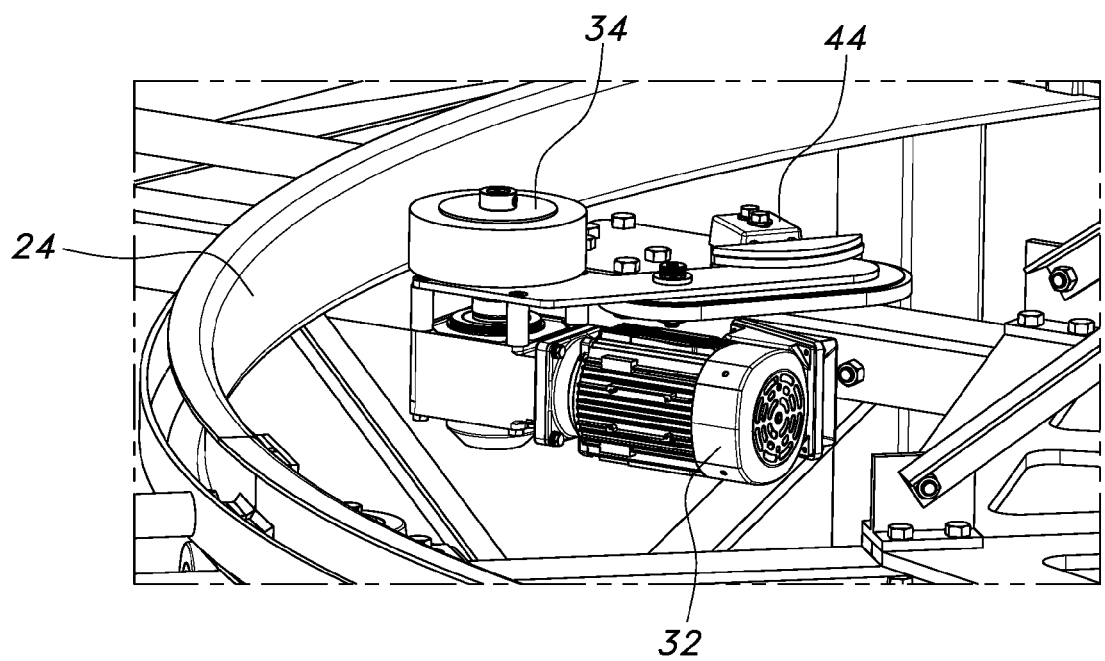
FIG. 9 is another perspective view of the drive mechanism for the free wheel assembly shown in FIG. 6.

As shown in greater detail in FIGS. 7-9, the second drive mechanism 26 includes a motor 32 coupled to a drive wheel 34. The motor 32 is supported on one of the support beams 28 of the frame 14 and the drive wheel 34 engages an inner circumferential surface 36 of the free wheel 24. The motor 32 rotates the drive wheel 34, which, in turn, drives the free wheel 24 around the center of the frame in the opposite direction of the cage.

In a preferred embodiment, the second drive mechanism 26 further includes a flexible coupling 38 so that contact between the drive wheel 34 and the inner surface 36 of the free wheel 24 is maintained regardless of any out-of-roundness imperfections that may exist in the free wheel. The flexible coupling 38 preferably includes a support plate 40, a motor arm 42 and a biasing element 44. The support plate 40 is fixed to the support beam 28 of the frame 14 and the biasing element 44 is mounted on the support plate. The motor arm 42 is pivotably mounted on the support plate 40 so that the motor arm can pivot about a pivot point 46. The second drive mechanism motor 32 is attached to one end of the motor arm 40 and the biasing element 44 engages an opposite end of the motor arm with respect to the pivot point 46. The biasing element 44 provides a spring force between the support beam and the drive wheel 34 for gently urging the drive wheel against the inner surface of the free wheel.

Rotation of the free wheel 24 is coordinated to the rotation of the cage 12 to ensure that the conveyor belt travels smoothly. This can be achieved with a conventional controller including electronics and/or software to synchronize the speed of both the cage motor 16 and the free wheel motor 32.

As a result of the present invention, conveyance of the belt is assisted by the free wheel and the second drive mechanism. Specifically, the motor of the second drive mechanism drives the drive wheel to rotate the free wheel around the central axis of the cage. The lateral edge of the conveyor belt frictionally contacts the outer radial surface of the free wheel and is thereby pulled by the free wheel around a curved path beneath the cage. By synchronizing the speed of the free wheel and the speed of the cage, tension in the conveyor belt can be minimized.

It should be apparent to those skilled in the art that the described embodiments of the present invention provided herein are illustrative only and not limiting, having been presented by way of example only. As described herein, all features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. While various embodiments of the present invention are specifically illustrated and/or described herein, it will be appreciated that modifications and variations of the present invention may be effected by those skilled in the art without departing from the spirit and intended scope of the invention.

All documents, patents and other literature referred to herein are incorporated by reference in their entirety.

The term "comprising" as may be used in the following claims is an open-ended transitional term that is intended to include additional elements not specifically recited in the claims. The term "consisting essentially of" as may be used in the following claims is a partially closed transitional phrase and is intended to include the recited elements plus any unspecified elements that do not materially affect the basic and novel characteristics of the claims. For example, the cable tie may be embossed or printed with indicia and still be included in the meaning of "consisting essentially of," even if not specifically recited. The term "consisting of" as may be used in the following claims is intended to indicate that the claims are restricted to the recited elements.

It should be noted that it is envisioned that any feature, element or limitation that is positively identified in this document may also be specifically excluded as a feature, element or limitation of an embodiment of the present invention.

What is claimed is:

1. A spiral conveyor belt system comprising:
   a rotatable cage;
   a first drive mechanism for rotating said cage about an axis in a first direction;
   an endless conveyor belt supported by said cage, said cage driving said conveyor belt along a helical path in said first direction;
   a rotatable free wheel, said free wheel rotating about an axis in a second direction opposite said first direction for guiding said endless conveyor belt from said cage along a return path and back to said cage; and
   a second drive mechanism for rotating said free wheel.

2. A spiral conveyor belt system as defined in claim 1, further comprising a conveyor belt return assembly for reversing the direction of said conveyor belt between said helical path and said return path.

3. A spiral conveyor belt system as defined in claim 2, wherein said conveyor belt return assembly comprises:
   a radially oriented conveyor portion for guiding said conveyor belt between said cage and said free wheel along a radial direction with respect to said helical path; and
   an axially oriented conveyor portion for guiding said conveyor belt between said cage and said free wheel along an axial direction with respect to said helical path.

4. A spiral conveyor belt system as defined in claim 1, wherein said free wheel has a diameter substantially equal to an outer diameter of said cage.

5. A spiral conveyor belt system as defined in claim 1, wherein said free wheel has an outer circumferential surface frictionally engaging an inner lateral edge of said conveyor belt for guiding said conveyor belt along said return path.

6. A spiral conveyor belt system as defined in claim 1, wherein said first drive mechanism comprises a first motor and said second drive mechanism comprises a second motor separate from said first motor.

7. A spiral conveyor belt system as defined in claim 6, wherein said second motor is disposed on an inner side of said free wheel for driving an inner circumferential surface of said free wheel.

8. A spiral conveyor belt system as defined in claim 1, wherein said second drive mechanism comprises:
- a second motor; and
- a drive wheel coupled to said motor between said second motor and said free wheel.

9. A spiral conveyor belt system as defined in claim 8, wherein said drive wheel engages an inner circumferential surface of said free wheel, whereby said motor rotates said drive wheel and said drive wheel drives said free wheel in said second direction.

10. A spiral conveyor belt system as defined in claim 8, wherein said second drive mechanism further comprises a flexible coupling for maintaining frictional contact between said drive wheel and said free wheel.

11. A spiral conveyor belt system as defined in claim 10, wherein said flexible coupling comprises:
- a support plate;
- a motor arm pivotably connected to said support plate about a pivot point, said second motor and said drive wheel being mounted to one end of said motor arm; and
- a biasing element fixed to said support plate and engaging an opposite end of said motor arm with respect to said pivot point, said biasing element biasing said drive wheel into frictional engagement with said free wheel.

12. A method for conveying an endless conveyor belt in a spiral conveyor belt system comprising:
- driving said endless conveyor belt along a helical path by rotating a cage about an axis in a first direction;
- guiding said endless conveyor belt from said rotating cage along a return path and back to said cage with a free wheel rotating about an axis in a second direction opposite said first direction;
- driving said cage in said first direction with a first drive mechanism; and
- driving said free wheel in said second direction with a second drive mechanism.

13. A method as defined in claim 12, wherein said guiding said conveyor belt along said return path comprises frictionally engaging an inner lateral edge of said conveyor belt with an outer circumferential surface of said free wheel.

14. A method as defined in claim 12, further comprising reversing direction of said conveyor belt between said helical path and said return path with a conveyor belt return assembly.

15. A method as defined in claim 14, wherein said reversing direction of said conveyor belt comprises:
- guiding said conveyor belt between said cage and said free wheel along a radial direction with respect to said helical path with a radially oriented conveyor portion of said conveyor belt return assembly; and
- guiding said conveyor belt between said cage and said free wheel along an axial direction with respect to said helical path with an axially oriented conveyor portion of said conveyor belt return assembly.

16. A method as defined in claim 12, wherein driving said free wheel comprises driving a drive wheel with a motor, said drive wheel frictionally engaging said free wheel for driving said free wheel in said second direction.

17. A method as defined in claim 16, wherein driving said free wheel further comprises urging said drive wheel against said free wheel with a biasing element for maintaining frictional contact between said drive wheel and said free wheel.

* * * * *